(12) United States Patent
Farrell et al.

(10) Patent No.: US 6,994,003 B2
(45) Date of Patent: Feb. 7, 2006

(54) LOAD CELL DEFLASHER ASSEMBLY AND METHOD

(75) Inventors: Brad Farrell, Lake Zurich, IL (US); Walter R. Krevald, Des Plaines, IL (US); Peter D. Urasky, Lisle, IL (US)

(73) Assignee: Diamond Machine Werks, Inc., Elk Grove, IL (US)

( * ) Notice: Subject to any disclaimer, the term of this patent is extended or adjusted under 35 U.S.C. 154(b) by 229 days.

(21) Appl. No.: 10/613,954

(22) Filed: Jul. 3, 2003

(65) Prior Publication Data

US 2005/0000331 A1  Jan. 6, 2005

(51) Int. Cl.
  *B26D 5/12* (2006.01)
  *B29C 45/38* (2006.01)

(52) U.S. Cl. .................... 83/13; 83/639.1; 83/76.8; 83/914; 425/806

(58) Field of Classification Search ................ 425/806; 83/914, 639.1, 639.2, 640, 641, 13, 76.8
See application file for complete search history.

(56) References Cited

U.S. PATENT DOCUMENTS

| | | | |
|---|---|---|---|
| 4,178,976 A | 12/1979 | Weiler et al. | |
| 4,342,184 A | 8/1982 | Van Eck et al. | |
| 4,671,763 A | 6/1987 | Weiler | |
| 4,707,966 A | 11/1987 | Weiler et al. | |
| 5,012,713 A * | 5/1991 | Schmitt | 83/639.3 |
| 5,299,478 A * | 4/1994 | Schorn et al. | 83/13 |
| 5,503,885 A * | 4/1996 | Anderson | 428/35.7 |
| 5,759,218 A | 6/1998 | Martin et al. | |
| 6,099,777 A * | 8/2000 | Marshall | 264/154 |
| 6,685,873 B2 * | 2/2004 | Weeks | 264/536 |

* cited by examiner

*Primary Examiner*—Charles Goodman
(74) *Attorney, Agent, or Firm*—James P. Hanrath

(57) ABSTRACT

A load cell deflasher for the punch and die deflash processing of product from an extrusion includes a load cell pressure transducer interconnected with a punch to sense pressure measurements of the punch against the extrusion at the die and communicate the measurements to a programmable logic controller that controls the extension and retraction of the punch to the die and the structure accommodating pre-punch alignment of the extrusion to the die. The pressure measurements are logged in a trending database of the programmable logic controller. If a pressure measurement exceeds a threshold value, to programmable logic controller can command instruct a positioning actuator of the punch to abort its punch stroke prior to completion. If the programmable logic controller determines an upward trend of pressure measurements, an auto-tune mode of the programmable logic controller can command instruct an extrusion card transfer positioning actuator to adjustably position a gripper carriage transferring the extrusion in intervening proximity between the punch and die to an optimal position for extrusion deflashing.

52 Claims, 14 Drawing Sheets

LOAD CELL DEFLASHER ASSEMBLY AND METHOD

BACKGROUND OF THE INVENTION

1. Field of the Invention

The present invention relates generally to a punch and die deflasher and method for the processing of product from an extrusion and, more particularly, to a load cell pressure transducer deflasher capable of sensing and communicating pressure measurements to a programmable logic controller that controls the extension and retraction of the punch to the die and/or the structure accommodating pre-punch alignment of the extrusion to the die in response to such pressure measurements.

2. Description of the Related Art

Heretofore, various punch and die deflashers for the processing of product from an extrusion have been utilized, the same controlling a punch to die stroke by non-reversible and non-sensitive hydraulic or pneumatic stroke actuator controls. In such prior art punch and die deflashers once a punch stroke is initiated, an extension stroke of the punch to the die to deflash product from an extrusion runs to completion without a capability to sensitively measure the pressure of the punch upon the extrusion and its attendant product and, if necessary, interrupt the punch stroke and reverse the same without deflashing contact. Further, such prior art punch and die deflashers deliver the extrusion for deflashing to a set position intervening the punch and die without the ability or structural means for adjusting the deflash position of the extrusion so as to minimize the deflash pressure of the punch against the extrusion at the die. To the contrary, such hydraulic or pneumatic punch actuators often employ a proximity switch to initiate a non-reversible punch advance and a proximity sensor to automatically return the punch. The lack of more control over the punch stroke and/or the extrusion deflash position in such prior art hydraulic or pneumatic punch actuators may be disadvantageous particularly when used in association with extrusions comprised of cooling plastics. For example, if the extrusion is not properly aligned relative to the punch and die (as may be the case due to a number of deflashing process environmental factors such as fluctuation in room or extrusion temperature, variation in wall thickness or weight of the extrusion, resin composition of the extrusion, etc.), the non-reversible hydraulic or pneumatic punch stroke may exert too much pressure upon the extrusion or its attendant product causing rupture of the same, breach of aseptic protocols, and production line halts.

SUMMARY OF THE INVENTION

According to one aspect of the present invention there is provided a load cell deflasher assembly for the processing of product from an extrusion comprising:

a positioning actuator operatively interconnected with a punch and capable of extension and retraction of the punch, the punch having at least one exteriorly facing punch surface cooperatively aligned to interact with the extrusion against a die, the positioning actuator having an encoder in communication with a programmable logic controller, the encoder being capable of monitoring the position of the punch and communicating the same to the programmable logic controller, a load cell pressure transducer interconnected with the positioning actuator for measuring the pressure of the punch against the extrusion at the die, the load cell pressure transducer capable of communicating the pressure measurements to the programmable logic controller, the positioning actuator being capable of extension or retraction of the punch in response to a command of the programmable logic controller based on the pressure measurement.

The load cell deflasher assembly controls the punch stroke in a manner responsive to the pressure measurements; if the pressure measurement of the load cell pressure transducer communicated to the programmable logic controller is equal to or less than a selected threshold limit an extension punch stroke is completed yet if such pressure measurement is greater than a selected threshold limit an extension punch stroke is aborted in favor of a retraction punch stroke.

Another aspect of the present invention includes a positioning assembly for variable positioning of an extrusion relative to a punch and die of a deflashing assembly comprising:

a positioning actuator cooperatively aligned with the punch and a die, the positioning actuator having an encoder in communication with a programmable logic controller, a gripper carriage engaged to the positioning actuator having means for gripping the extrusion and delivering the extrusion to a deflash position in intervening proximity between the punch and die, the encoder being capable of monitoring the position of the gripper carriage relative to the positioning actuator and communicating the same to the programmable logic controller, the positioning actuator being capable of adjustably positioning the gripper carriage relative to the positioning actuator in response to a command of the programmable logic controller to thereby alter the deflash position of the extrusion in intervening proximity between the punch and die.

Preferably, the means for gripping the extrusion and delivering the extrusion to a deflash position in intervening proximity between the punch and die comprise a shuttle plate interconnected with the gipper carriage having at least one gripper, the gripper terminating in a gripper jaw capable of engaging the extrusion card and delivering the same in adjustable proximity between the punch and die by movement of the gripper carriage relative to the positioning actuator.

Another aspect of the present invention includes a load cell deflasher assembly for the processing of product from an extrusion in combination with a positioning assembly for variable positioning of the extrusion relative to a punch and die of the deflashing assembly comprising:

a first positioning actuator operatively interconnected with a punch and capable of extension and retraction of the punch, the punch having at least one exteriorly facing punch surface cooperatively aligned to interact with the extrusion against a die, the first positioning actuator having a first encoder in communication with a programmable logic controller, the first encoder being capable of monitoring the position of the punch and communicating the same to the programmable logic controller, a load cell pressure transducer interconnected with the first positioning actuator for measuring the pressure of the punch against the extrusion at the die, the load cell pressure transducer capable of communicating the pressure measurements to the programmable logic controller, the first positioning actuator being capable of extension or retraction of the punch in response to a command of the programmable logic controller based on the pressure measurement, a second positioning actuator cooperatively aligned with the punch and a die, the second positioning actuator having a second encoder in communication with the programmable logic controller, a gripper carriage engaged to the second positioning actuator having means for gripping the extrusion and delivering the extrusion to a deflash position in intervening proximity between the punch and die, the second encoder being capable of monitoring the position of the gripper carriage relative to the second positioning actuator and communicating the same to the programmable logic controller, the second positioning actuator being capable of adjustably positioning the gripper carriage relative to the second positioning actuator in response to a command of the programmable logic controller based on the pressure measurements of the load cell pressure transducer to thereby set or vary the deflash position of the extrusion in intervening proximity between the punch and die.

Preferably the programmable logic controller of the load cell deflasher assembly in combination with the positioning assembly includes a trending database of logged pressure measurements of the load cell pressure transducer such that if the programmable logic controller detects an upward trending of the pressure measurements in the trending database exceeding a selected threshold limit, an auto-tune mode of the programmable logic controller is activated to, in sequential process steps, adjust the position of the extrusion relative to the punch and die to a locus of minimum pressure measurement.

A further aspect of the present invention includes a method for deflashing product from an extrusion adjustably positioned in intervening proximity between a punch and die comprising the steps of:

monitoring the position of the punch, communicating the monitored position of the punch to a programmable logic controller, measuring the pressure of the punch against the extrusion at the die, communicating the pressure measurement to the programmable logic controller, setting a threshold limit of allowable pressure of the punch against the extrusion at the die, controlling the extension and retraction of the punch stroke of the punch by commands of the programmable logic controller executed by a positioning actuator of the punch, wherein if the measured pressure of the punch against the extrusion at the die is equal to or less than the threshold limit allowing the punch stroke to be completed, and wherein if the measured pressure of the punch against the extrusion at the die is greater than the threshold limit retracting the punch stroke.

Still further, another aspect of the present invention provides a method for adjustably positioning an extrusion in intervening proximity between a punch and die for deflashing comprising the steps of:

gripping the extrusion by structure interconnected with a gripper carriage engaged to a positioning actuator, monitoring the position of the gripper carriage relative to the positioning actuator, communicating the monitored position of the gripper carriage relative to the positioning actuator to a programmable logic controller, delivering the extrusion to a deflash position in intervening proximity between the punch and die, measuring the pressure of the punch against the extrusion at the die at the deflash position, communicating the pressure measurement to the programmable logic controller, adjusting the deflash position by commands of the programmable logic controller executed by the positioning actuator of the gripper carriage.

Preferably, the foregoing method also includes the steps of maintaining a trending database of the pressure measurements communicated to the programmable logic controller, and determining any trend of the pressure measurements such that the additional steps can be carried out of adjusting the previous deflash position in a segmentally measured selected direction in response to the determined trend by command of the programmable logic controller executed by the positioning actuator of the gripper carriage.

The present invention in one aspect advantageously provides for a sensitive monitoring of pressure exerted by a punch upon an extrusion against a die to control, and if necessary abort interrupt and retract, the deflashing punch stroke to the die without deflashing contact. Further, the present invention in another aspect provides for a variable pre-punch positioning of the extrusion in intervening proximity between the punch and the die responsive to prior deflashing pressure measurements to provide an optimum yet adjustable (in view of subsequent environmental factors) deflashing position of the extrusion that minimizes the deflashing pressure exerted by the punch upon the extrusion against the die. Such advantages are desirable to avoid product punch/die rupture and to maintain aseptic protocols despite production run environmental factors that could adversely affect the deflashing process such as extrusion cooling shrinkage, fluctuation in room temperature, variation in wall thickness or weight of the extrusion, resin composition, among other factors, that may contribute to a misalignment of the workpiece or product to be deflashed with the punch and die. Still further, the present invention's adjustable and variable pre-punch positioning of the extrusion to the punch and die may optionally present an entire extrusion card to the punch and die for deflashing or only a section by section portion of the extrusion to the punch and die for deflashing. This ability to deflash a single extrusion card in multiple sequential section by section punch to die strokes may be beneficial for certain deflashing operations and accommodate significant reductions in punch and die tooling.

Additional features and advantages of the present invention will become apparent to those skilled in the art from the following description and the accompanying figures illustrating preferred embodiments of the invention, the same being the present best mode for carrying out the invention.

DESCRIPTION OF THE PREFERRED EMBODIMENT(S)

Figure 1:
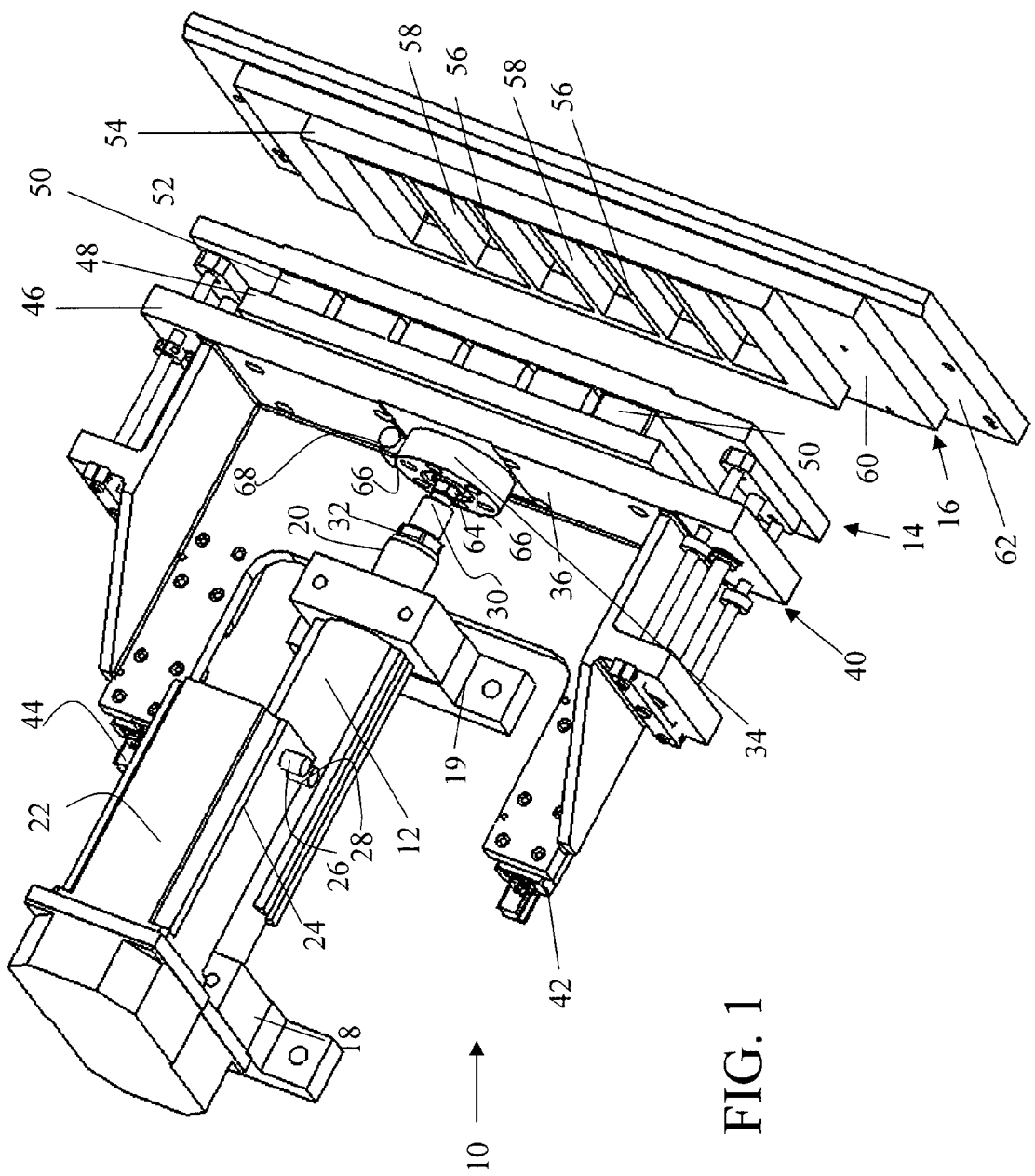
FIG. 1 is a top perspective view of a load cell deflasher assembly constructed in accordance with teachings of the present invention illustrating a punch and die.

Referring now to FIG. 1, there is shown a load cell deflasher assembly 10 constructed in accordance with the teachings of the present invention. Load cell deflasher assembly 10 includes a positioning actuator 12 for extension and retraction delivery of a punch 14 to and from a complimentary aligned die 16. The positioning actuator 12 preferably is stabilized within actuator mounting blocks 18, 19 (for clarity, machine surfaces or support plates for the mounting blocks are not illustrated) and includes an extension rod 20 capable of extension and retraction movement in response to a controller, motor, or driver serving as means for powering the positioning actuator 22.

A servo motor 24 is a preferred controller, motor, or driver for powering the positioning actuator 12 since it operates upon sequential looped counts or pulses. The means for powering the positioning actuator may also comprise an AC motor, a stepper motor, a pneumatic driver, a hydraulic driver, an electrical driver, a cam driver, or other means for controlling the extension and retraction movement of the positioning actuator extension rod 20. Servo motor 24 includes a power connection 26 and an encoder 28 (or functional equivalent of the encoder, such as a linear transducer) communicative with a programmable logic controller 136 (see the schematic drawing of FIG. 12).

Extension rod 20 includes a threaded connection piece 30 at its external end 32 which is threadly connected to a load cell pressure transducer 34 that is screw mounted at a rear surface 36 of the punch 14. Although punch 14 is illustrated as a punch carriage assembly 40 movable upon a pair of punch carriage support rails 42 and 42 that includes a punch support plate 46 distal of a punch plate 48 having a plurality of punch surfaces 50 extending proximally thereof for ultimate movement through a stripper plate 52, the particular design of the punch at FIG. 1 is arbitrary and may be of various forms recognized in the punch and die arts. Likewise, the die 16 illustrated at FIG. 1 is arbitrary and may take the form of alternative die designs know within the punch and die arts complimentary cooperative with the design of a selected punch. Die 16 includes a die block 54 having a plurality of shearing pockets 56 defined by a plurality of vertical shear walls 58 corresponding to and dimensioned for cooperative receipt of the punch surfaces 50 of punch 14. Die 16 is further illustrated as including a die support plate 60 distal of the die block 54 and proximal of a die backup plate 62, the same providing sufficient strength to the die to withstand the punch deflashing process for a durable term. For clarity of illustration, structure, well known in the punch and die arts, for positioning die 16 in complimentarily alignment with punch 14 is not shown in FIG. 1.

The load cell pressure transducer 34 is engaged to the threaded connection piece 30 of the extension rod 20 at a central point of its rearward surface 64 and includes a plurality of mounting holes 66 among the periphery of its rearward surface to accommodate screw attachment of the load cell pressure transducer to the rear surface 36 of punch support plate 46. The load cell pressure transducer can sense and measure the pressure of the punch 14 against an extrusion and/or its integral workpiece or product at the die 16 so as to send an analog signal from its feedback connection 68 to a programmable logic controller 136 (see FIG. 12). The programmable logic controller 136 compares this signal (in direct or converted format) to a selected threshold or parameter that is selectively tailored to the workpiece or product that an extrusion provides to the punch 14 and die 16. For example, the load cell pressure transducer may measure a pressure force of the punch to the extrusion and die of up to 4,000 pounds per square as being within a suitable parameter for the programmable logic controller 136 to allow for completion of a punch stroke, but a force exceeding 4,000 pounds per square inch as being outside of the established parameter causing the programmable logic controller 136 to trigger a rejection cycle of the positioning actuator 12 that provides for an aborted interrupted retraction of the extension rod 22 prior to the deflashing completion of the punch stroke.

Figure 2:
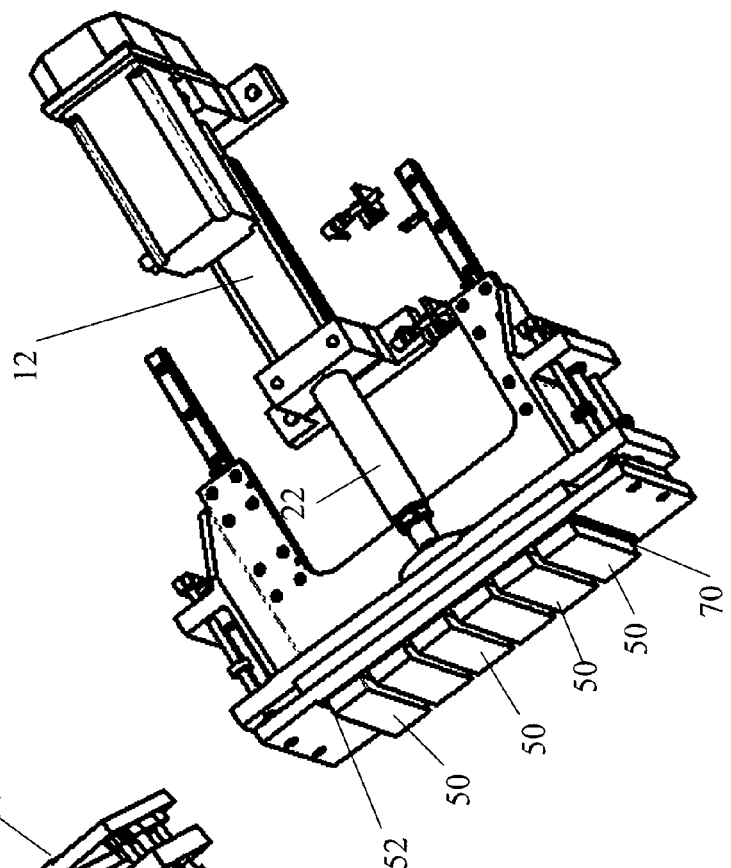
FIG. 2 is a top perspective view of the load cell deflasher assembly of FIG. 1 wherein a positioning actuator of the punch is in an extended position.
Figure 3:
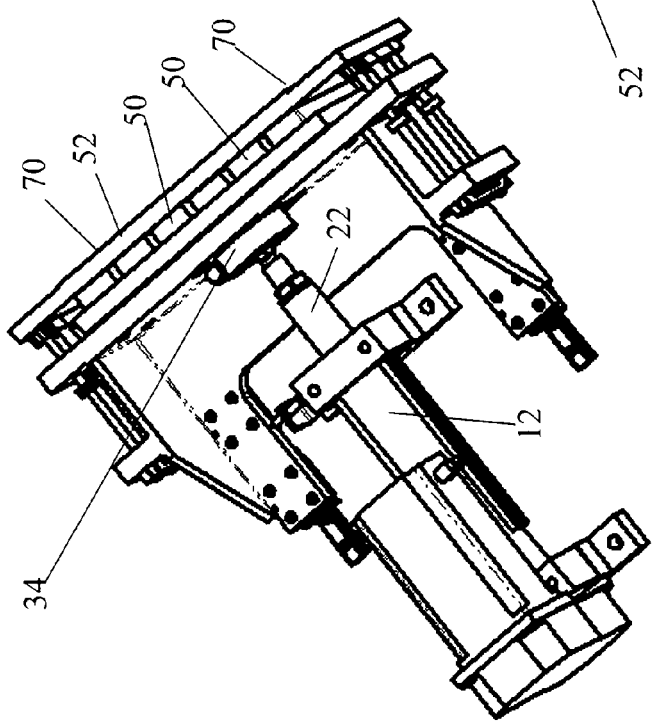
FIG. 3 is a top perspective view of the load cell deflasher assembly of FIG. 1 wherein the positioning actuator of the punch is in a retracted position.

At FIG. 2 the extension rod 22 of the positioning actuator 12 is fully extended to dispose the plurality of punch surfaces 50 through the punch surface openings 70 of the stripper plate 52. At FIG. 3 the extension rod 22 of the positioning actuator 12 is fully retracted with the punch surfaces 50 withdrawn rearward of the punch surface opening 70 of the stripper plate 52.

Figure 4:
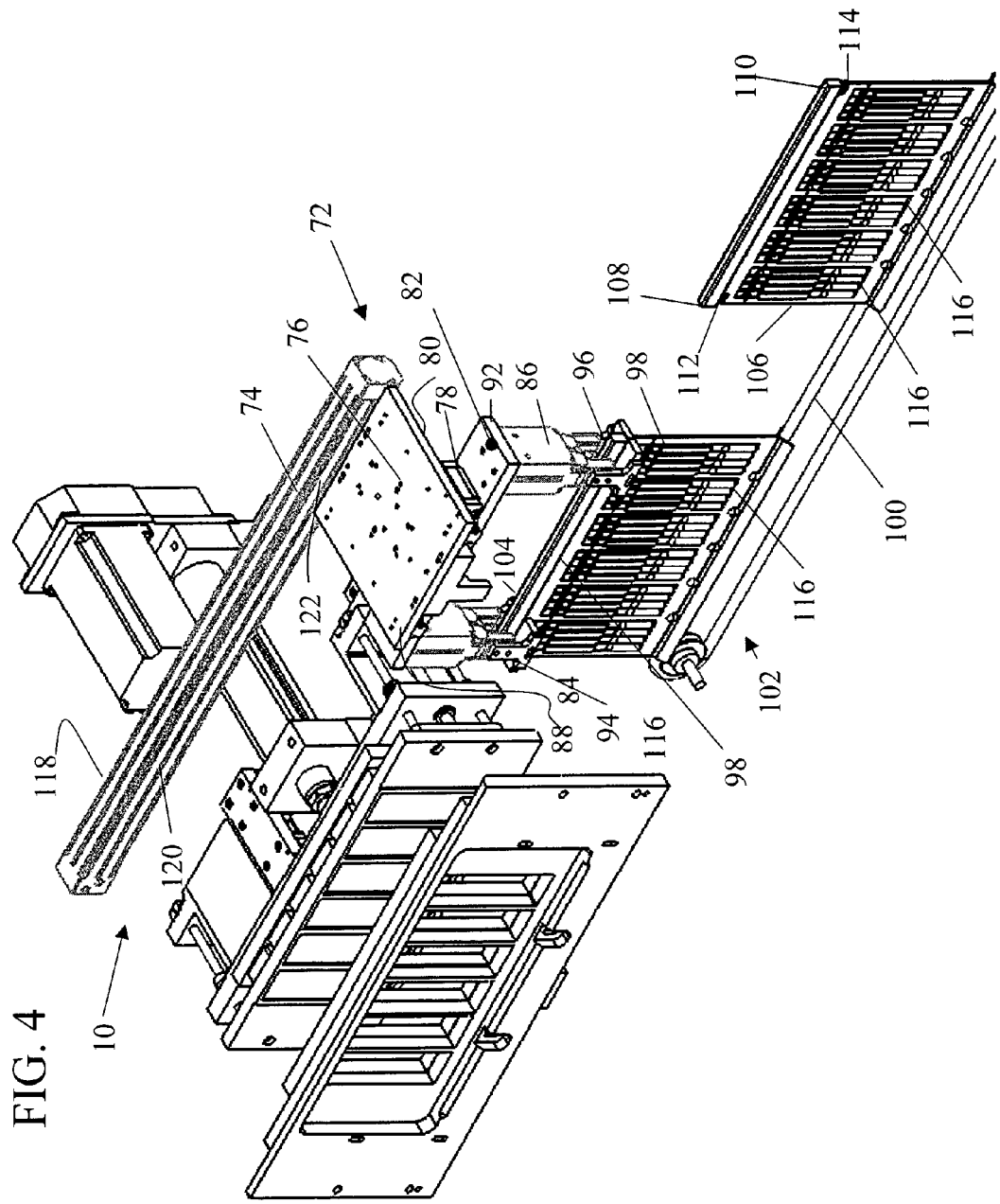
FIG. 4 is a perspective view of the load cell deflasher assembly of FIG. 1 cooperating with an extrusion card positioning assembly for precise positioning of an extrusion to the load cell deflasher assembly punch and die, the same illustrating a first tooling sequence for transporting product to the load cell deflasher assembly wherein a extrusion card is gripped by a gripper jaws of a gripper.

In FIG. 4, the load cell deflasher assembly 10 is illustrated with an extrusion card positioning assembly 72 that includes a card transfer positioning actuator 74 capable of directing linear movement of a gripper carriage 76. Gripper carriage 76 operates as an x-axis positioning mechanism of a y-axis orientated setting body 78 connected at the underside 80 of the gripper carriage 76. The setting body 78 serves as a bearing for a shuttle plate 82 that includes a pair of aligned card grippers 84 and 86 at the extended end portions 88 and 90 of the shuttle plate's underside surface 92. The card grippers each include a pair of opposed gripper jaws 94 and 96 to clamp engage a selected extrusion card 98 from a continuous web or stream of extrusion cards conveyed to the card grippers 84 and 86 by appropriate means such as, for example, a belt in-feed conveyor 100. In particular, FIG. 4 illustrates an extrusion card 98 conveyed to a first tooling sequence pick up position 102 wherein an upper border 104 of the extrusion card 98 is disposed between the respective gripper jaws 94 and 96 of card grippers 84 and 86 in a longitudinal plane parallel to the card transfer positioning actuator 74 for ultimate aligned placement in intervening proximity between the punch 14 and die 16 of the load cell deflasher assembly 10. At this initial pick up position 102, the gripper jaws 94 and 96 clamp inward and perpendicular to the upper border 104 of the extrusion card 98 to engage and transport the same to the interval between the punch and die of the load cell delasher. Preferably, as best shown at the sequentially following extrusion card 106, the upper border 104 of the extrusion card has a proximal reference point 108 and a distal reference point 110, such as notches 112 and 114 respectively, which serves as a relative indicator of location of the workpiece or product carried within the extrusion card. The notches may be of several forms as they serve as an irregular surface area to the upper portion of the extrusion.

At FIGS. 4 through 11, the extrusion cards 98 and 106 carry six discrete sections of workpiece products to be ultimately deflashed from the extrusion, namely each section 116 comprises a group of four ampoules. Of course, the workpiece or product integral with the extrusion card is arbitrary as there can be one unit of workpiece or product per extrusion card, two per extrusion card, or some other number as best suited to the particular deflashing process to be undertaken. Since many extrusions are made of plastics or a variety of propylene materials which are initially formed at an elevated temperature that causes the extrusion card to shrink upon cooling prior to the deflashing contact of their workpiece or product, the exact position of the workpiece or product to be deflashed from a particular extrusion card in an in-feed stream or web of extrusion cards can vary from others of the stream or web of extrusion cards submitted for deflashing. It is therefore advantageous for the gripper jaws to initially grip an extrusion cards at a defined reference point such that there is at least a general, albeit not yet a more specific, determination of the relative positions of the workpiece or product to be deflashed contained within the extrusion card. At the first tooling sequence pick up position 102 of FIG. 4, gripper carriage 76 is linearly displaced relative to the card transfer positioning actuator 74 at its maximum linear position proximal to the supply stream or web of extrusions and distal of the extrusion deflashing position. This pick-up point combined with the pair of gripper jaws 94, 96 engaging the extrusion card at its proximal and distal reference points 108 and 110 respectively denotes a general location of the workpiece or product to be deflashed prior to presentation of the same to the punch 14 and die 16 of the load cell deflasher assembly 10 by movement of said gripper carriage 76 along the longitudinal length of the card transfer positioning actuator 74. Nevertheless, more specificity is desirable to avoid product punch/die rupture and maintain a sterile deflashing environment, primarily because cooling shrinkage of an extrusion card can occur subsequent to card gripping and prior to punch deflashing thus fostering misalignment of the workpiece or product to be deflashed with the punch and die.

As will be discussed in more detail hereinafter, the card transfer positioning actuator 76 includes an encoder 118 in communication with a programmable logic controller 136 (see FIG. 12). The encoder 118 is capable of monitoring the position of the gripper carriage 76 relative to its engagement within the longitudinal length of the card transfer slide positioning actuator, communicating such a monitored position to the programmable logic controller 136, and adjustably altering the engagement position of the gripper carriage relative to the positioning actuator in response to a command of the programmable logic controller 136 so as to alter the ultimate deflash position of the extrusion card in intervening proximity between the punch and die. In this regard, the engagement of the gripper carriage with the card transfer positioning actuator preferably comprises the positioning actuator having a longitudinal slot 120 and a rear side portion 122 of the gripper carriage 76 being suited to engage the longitudinal slot 120 for linear movement therein in response to commands of the programmable logic controller 136 executed by the card transfer positioning actuator 74. The locus of this engagement of the gripper carriage 76 within the longitudinal slot 120 of the card transfer positioning actuator 74 defines two tooling sequence positions: (1) a extrusion pick up position (tooling sequence pick up position 102) of the gripper carriage 76 at a first portion 124 of the longitudinal slot 120 proximal to a supply of extrusions and distal to the punch and die, and (2) an adjustably variable extrusion deflashing position 126 at a second portion 128 of the longitudinal slot distal from the supply of extrusions and proximal to the punch and die. The former pick up position 102 can be a fixed, set position, yet the latter deflash position 126 of the present invention advantageously encompasses a range of potential positions accommodating an adjustable, controlled, preferably segmentally measured, variance of the gripper carriage positioning relative to the second portion 128 of the longitudinal slot 120 of the card transfer positioning actuator 74 in response to a command of the programmable logic controller 136. The adjustable variance, in turn, may optionally present an entire extrusion card to the punch and die for deflashing or only a portion of the extrusion to the punch and die for deflashing. Indeed, the ability to sequentially deflash a single extrusion card in multiple sequential punch to die strokes may be beneficial in many suitable deflashing operations. If a portion of the extrusion is presented for deflashing, the extrusion may be sequentially presented section by section to the punch and die for deflashing to accommodate potentially significant reductions in punch and die tooling. For example, extrusion card 98 is illustrated as having six sections 116 comprised of four ampoules each. To deflash all six sections in one puch to die stroke, a correspondingly complimentary punch and die is required. However the present invention allows for a controlled segmental sequential deflash positioning of the extrusion card 98 to the punch and die to deflash sections 116 individually or in groups of two or three at a punch stroke, if desired, resulting in smaller punch and die tooling.

FIG. 4 illustrates an initial pick-up position of the extrusion deflash sequence with punch 14 in retracted position; FIGS. 5 through 11 illustrate subsequent sequences of a normal deflash cycle. The method of deflashing and controlled structure of the present invention advantageously monitors and adjusts the normal cycle so as, in appropriate circumstances, to abort interrupt a deflash punch stroke in favor of punch retraction and/or alter the extrusion deflash position at the punch and die responsive to loads cell pressure transducer measurements.

Figure 5:
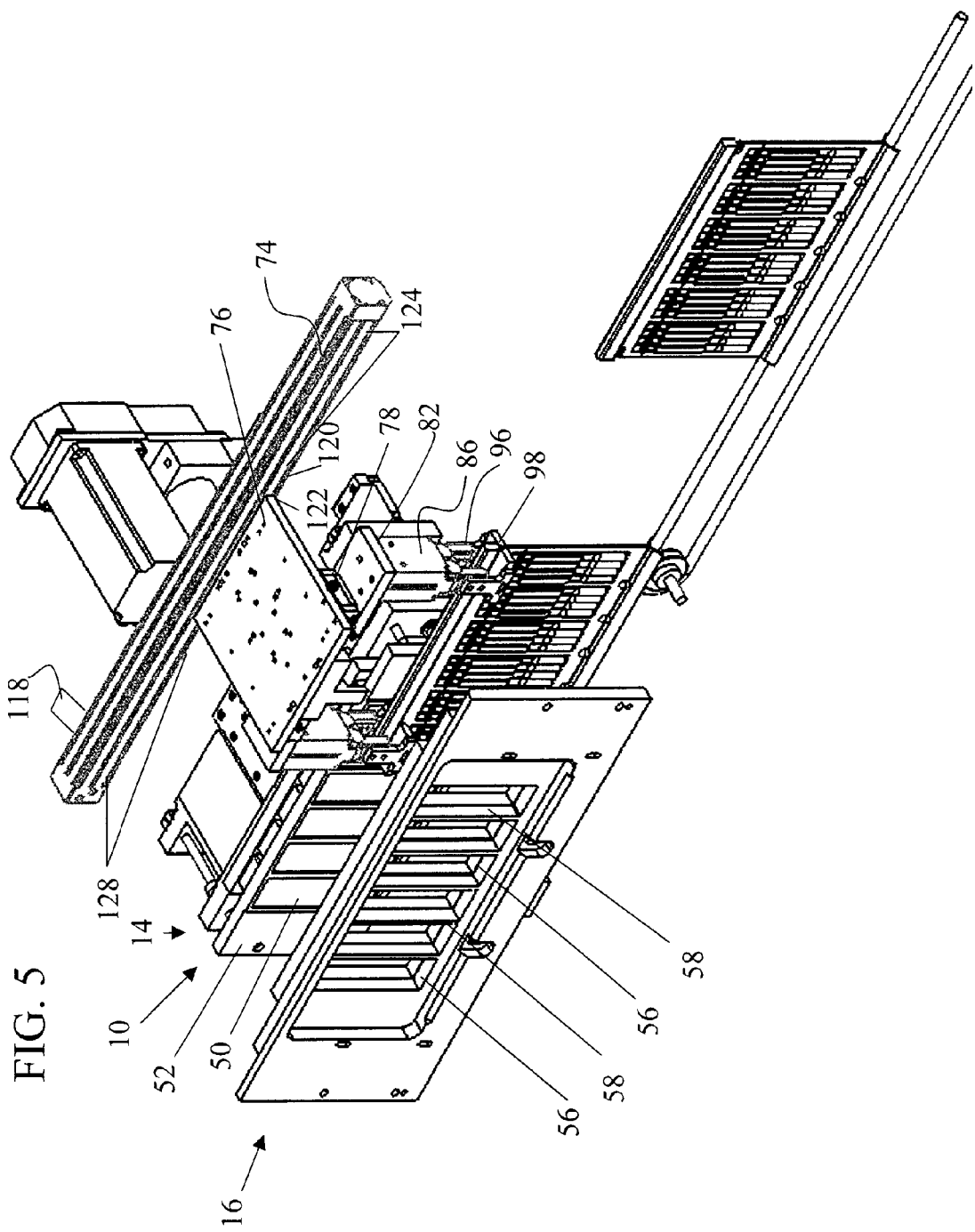
FIG. 5 is a perspective view of a second tooling sequence of the load cell deflasher assembly and card transfer slide actuator of FIG. 4 wherein the gripped extrusion card is transported to the load cell deflasher assembly by a gripper carriage.

In FIG. 5 there is illustrated a second tooling sequence wherein the extrusion card 98 gripped by gripper jaws 94 and 96 is transported toward the load cell deflasher assembly 10 by virtue of linear movement of gripper carriage 76 along the longitudinal slot 120 card transfer positioning actuator 74. The setting body 78, shuttle plate 82, grippers 84 and 86, gripper jaws 94 and 96, and the extrusion card 98 all travel in the same longitudinal plane to dispose the extrusion card in intervening proximity between the load cell deflasher assembly punch 14 and die 16, (namely, the interval between stripper plate 52 with its retracted punch surfaces 50 of the punch 14 and the die 16 with its plurality of corresponding shearing pockets 56 and vertical shear walls 58).

Figure 6:
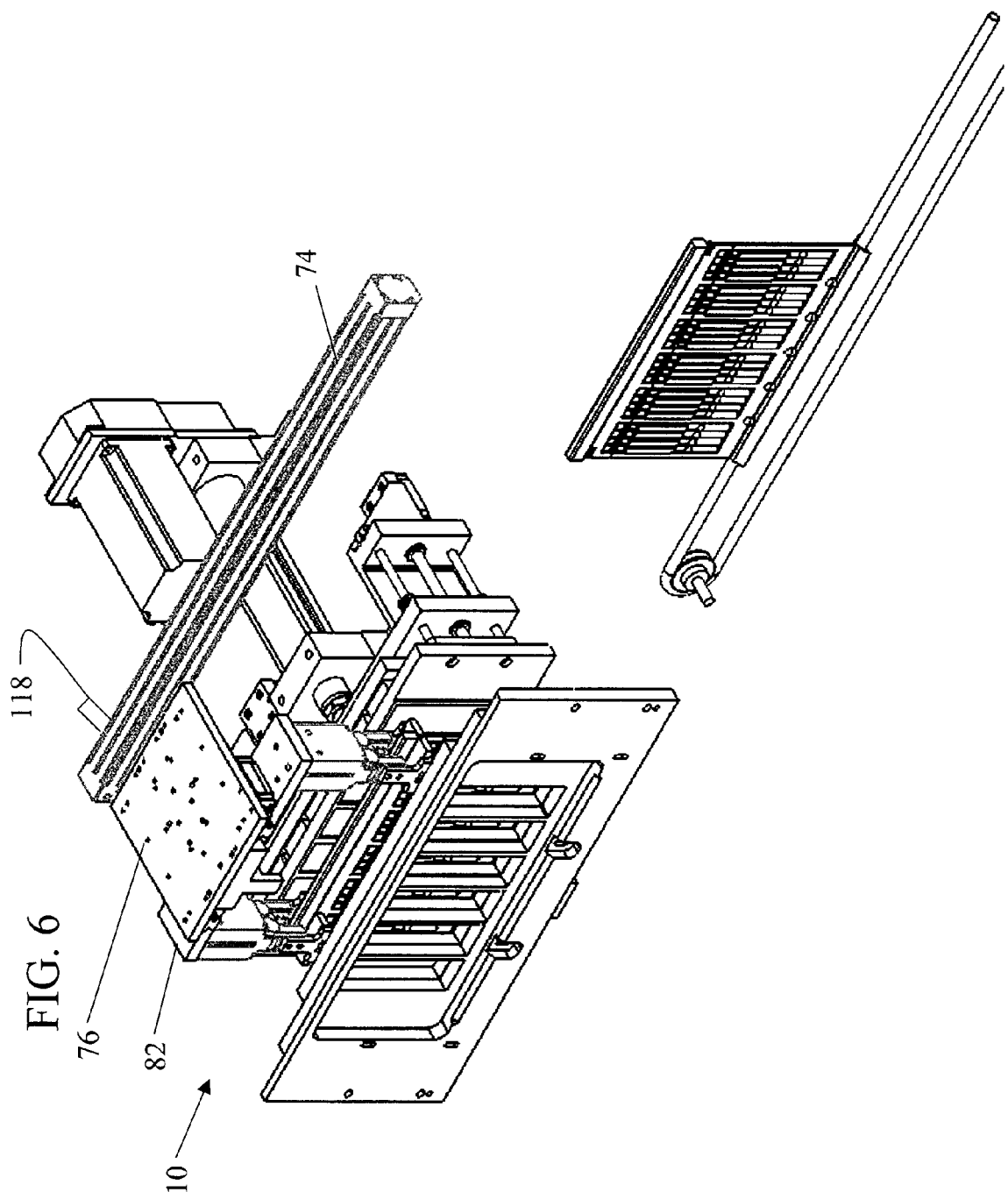
FIG. 6 is a perspective view of a third tooling sequence of the load cell deflasher assembly and card transfer slide actuator of FIG. 4 wherein the extrusion card is aligned to the load cell deflasher assembly punch and die by the gripper carriage.

The third tooling sequence illustrated at FIG. 6 shows the extrusion card 98 fully transported to the punch and die interval of the load cell deflasher assembly 10 with the gripper carriage 76 now moved along longitudinal slot 120 to a position aligned for deflashing set by command of the programmable logic controller 136 executed by encoder 118 of the card transfer positioning actuator 74. Again, the setting body 78, shuttle plate 82, grippers 84 and 86, gripper jaws 94 and 86, and the extrusion card 98 remain in the same longitudinal plane and now dispose the extrusion card 98 aligned to the load cell deflasher assembly punch 14 and die 16.

Figure 7:
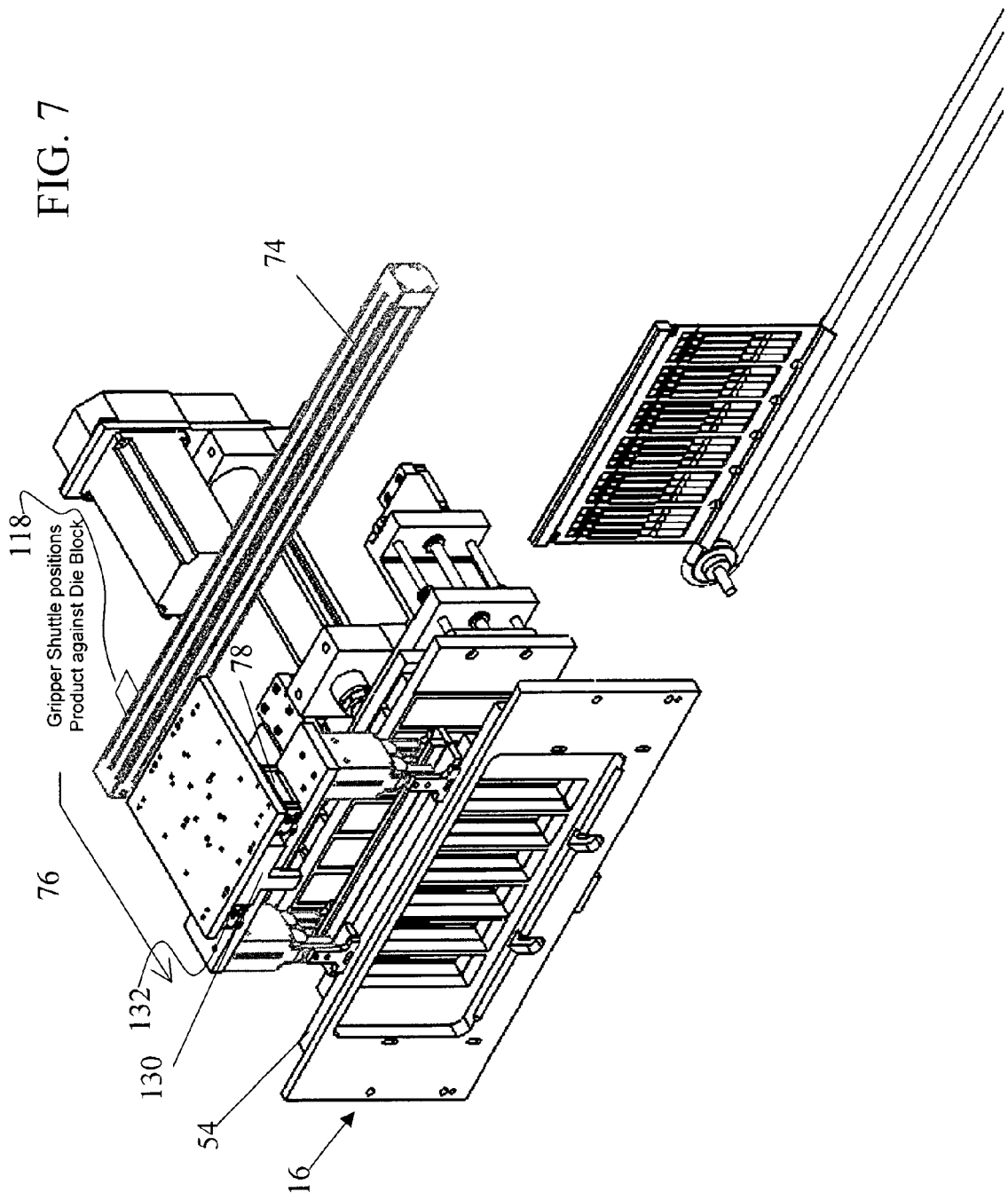
FIG. 7 is a perspective view of a fourth tooling sequence of the load cell deflasher assembly and card transfer slide actuator of FIG. 4 wherein a setting body of a shuttle plate of the grippers positions the extrusion card against the die of the load cell deflasher assembly.

FIG. 7 illustrates a fourth tooling sequence wherein the setting body 78 moves perpendicular to its previous longitudinal plane to abut against stop piece 130 connected at the outer bottom edge 132 of the gripper carriage 76 and thereby place the setting body 78, shuttle plate 80, grippers 84 and 86, gripper jaws 94 and 96, and the extrusion card 98 in an outwardly shifted position from it previous longitudinal plane shown at FIG. 6 so as to set the extrusion card 98 and its attendant workpiece or product against the die block 54 of die 16 in a final placement before the load cell deflasher assembly punch stroke.

Figure 8:
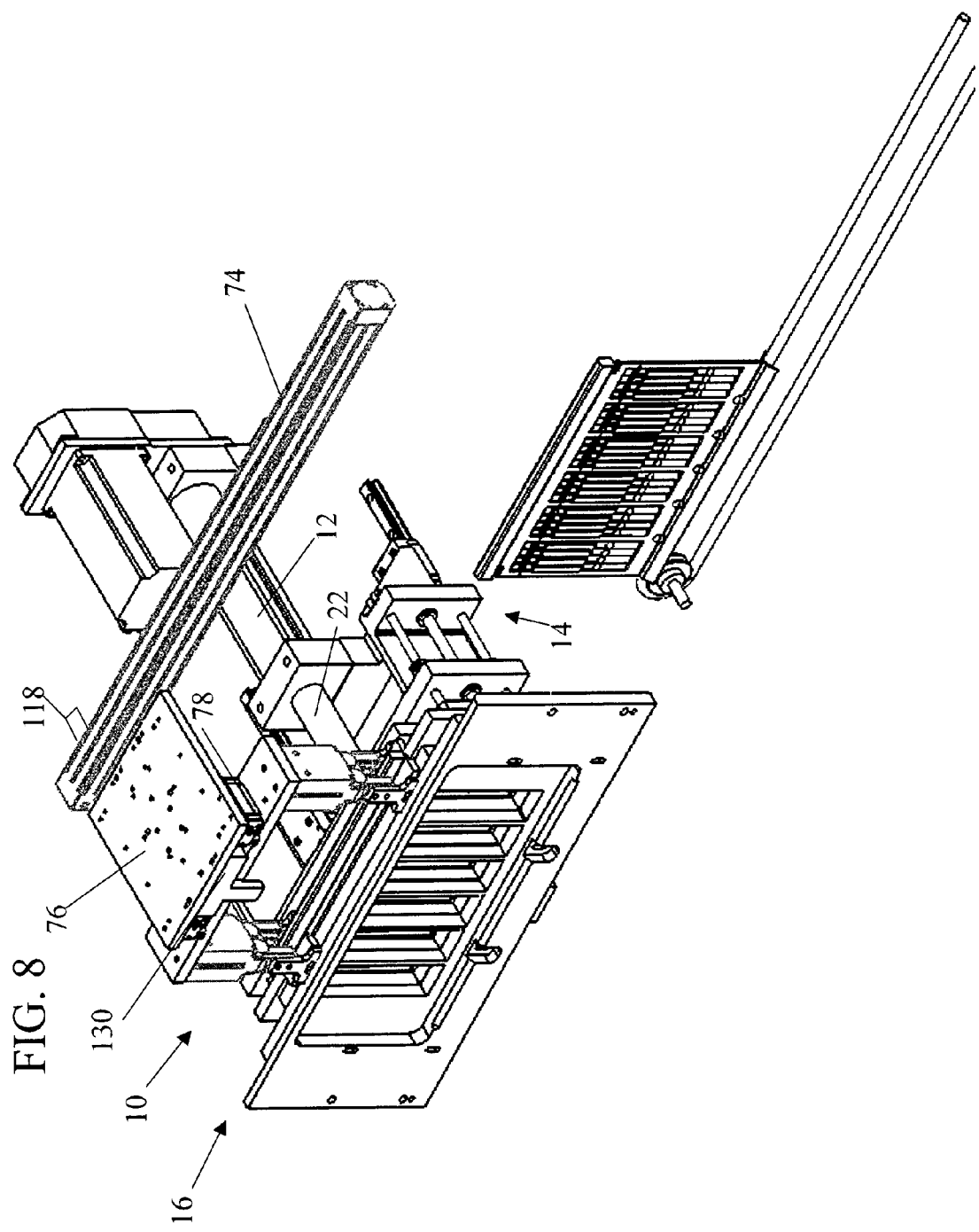
FIG. 8 is a perspective view of a fifth tooling sequence of the load cell deflasher assembly and card transfer slide actuator of FIG. 4 wherein the punch of the load cell deflasher commences its extension punch stroke in a manner allowing the load cell to sense the punch pressure against the extrusion at the die to provide a pressure measurement feedback reading wherein if the reading remains within set parameters the extension punch stroke is completed, yet if the reading exceeds set parameters a reject cycle of the punch is initiated causing retraction of the punch before its commenced punch stroke is completed.

With the extrusion now properly positioned for deflashing punch stroke, FIG. 8 illustrates a fifth tooling sequence wherein the positioning actuator 12 of the load cell deflasher assembly 10 commences the deflashing punch by extension of the extension rod 22 and punch 14 toward the die 16. During the punch stroke the load cell pressure transducer 34 senses and measures the pressure of the punch against the extrusion 98 and/or its integral workpiece or product 116, and communicates the same to the programmable logic controller 136 which commands the punch positioning actuator 12, according to program parameters, to allow the punch to proceed to completion if the pressure measurement is equal to or less than a threshold limit selected as appropriate to the deflash operation undertaken but to interrupt the punch by initiation of a rejection cycle if the pressure measurement exceeds the set threshold.

Figure 9:
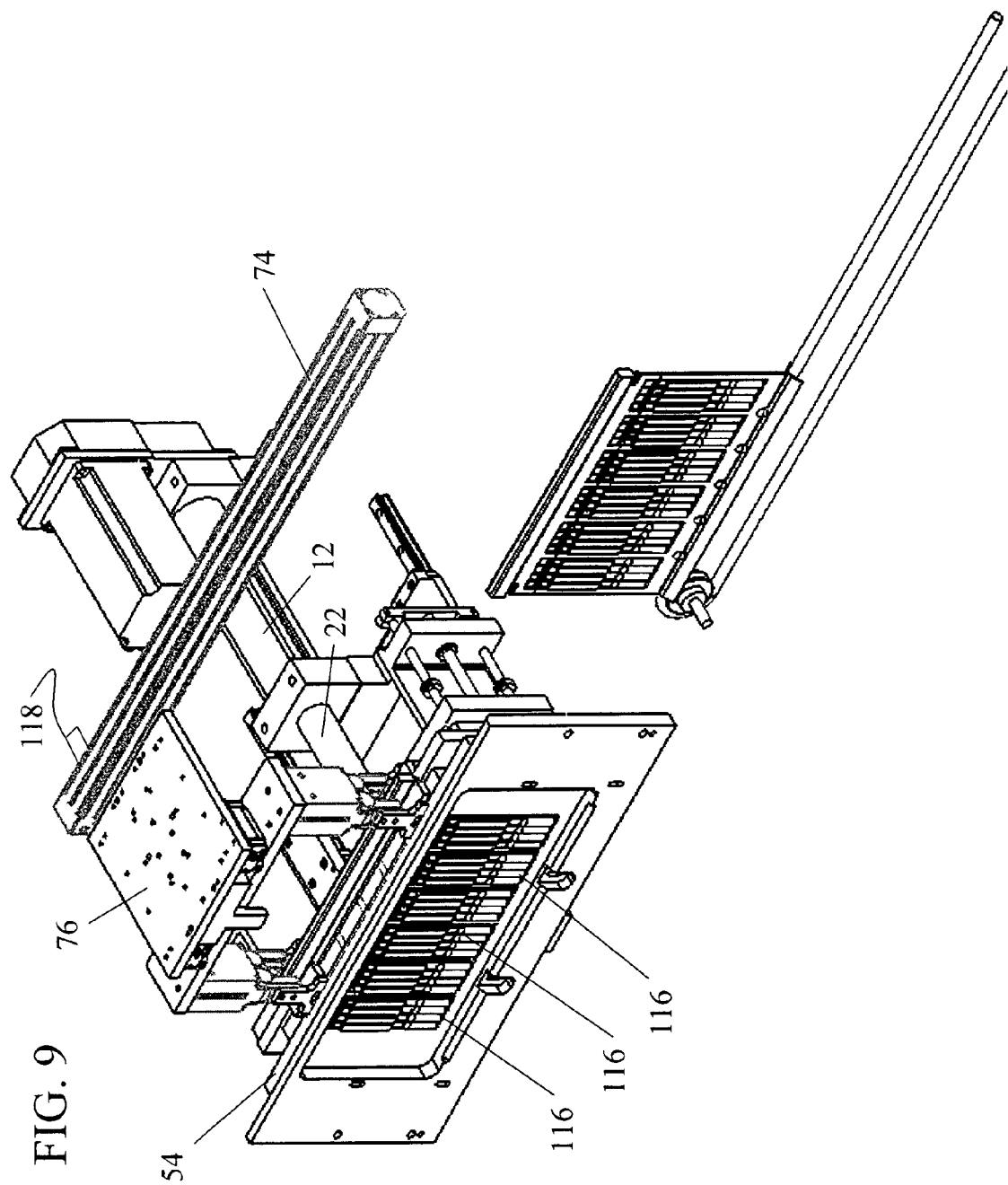
FIG. 9 is a perspective view of a sixth tooling sequence of the load cell deflasher assembly and card transfer slide actuator of FIG. 4 wherein the punch of the load cell deflasher advances to completion since the load cell measurement feedback readings remain within set parameters.

In FIG. 9, a sixth tooling sequence is shown wherein the punch stroke is allowed to continue to completion, as the load cell pressure transducer pressure measurement is validated to be within the set threshold, thus causing the extrusion work piece or product (here, six sections 116 of four ampoule groups) to be deflashed from the extrusion into and through the shearing pockets 56 of die block 54 to a suitable receptacle, belt, conveyor, or process path after the punch surface 50 and vertical shear wall 58 interaction.

Figure 10:
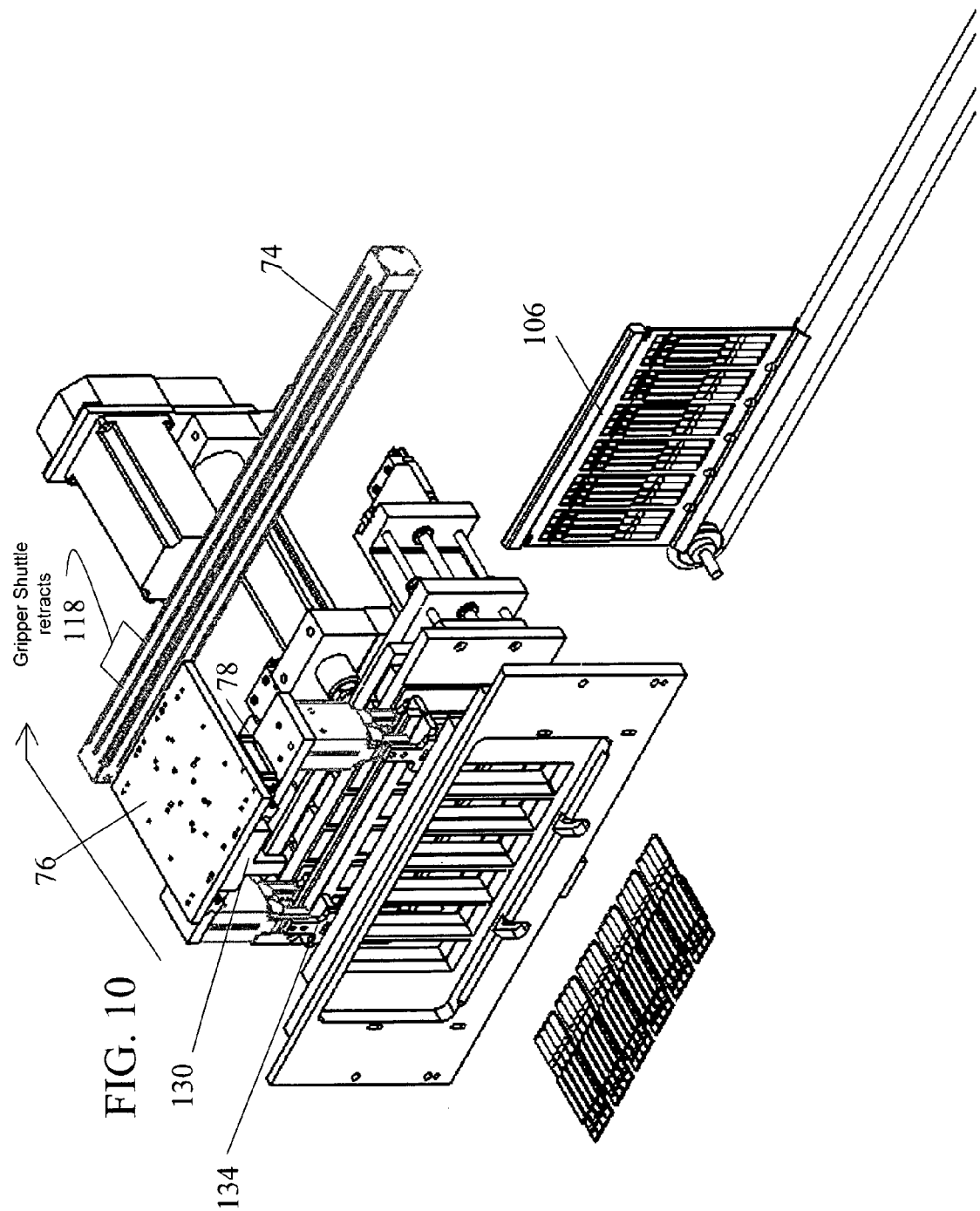
FIG. 10 is a perspective view of a seventh tooling sequence of the load cell deflasher assembly and card transfer slide actuator of FIG. 4 wherein the punch of the load cell deflasher and the setting body of the shuttle plate of the grippers retract after the deflashing of the workpiece or product from the extrusion.

In FIG. 10, a seventh tooling sequence is illustrated wherein after deflashing the workpiece or product 116 the setting body 78 retracts inward from its previous outwardly extended position abutting stop piece 130 of the gripper carriage 76. The retraction thereby places the setting body 78, shuttle plate 82, grippers 84 and 86, gripper jaws 94 and 96, and the deflashed extrusion card frame 134 in its previous longitudinal plane shown at FIGS. 4 through 6. The punch 14 also retracts.

Figure 11:
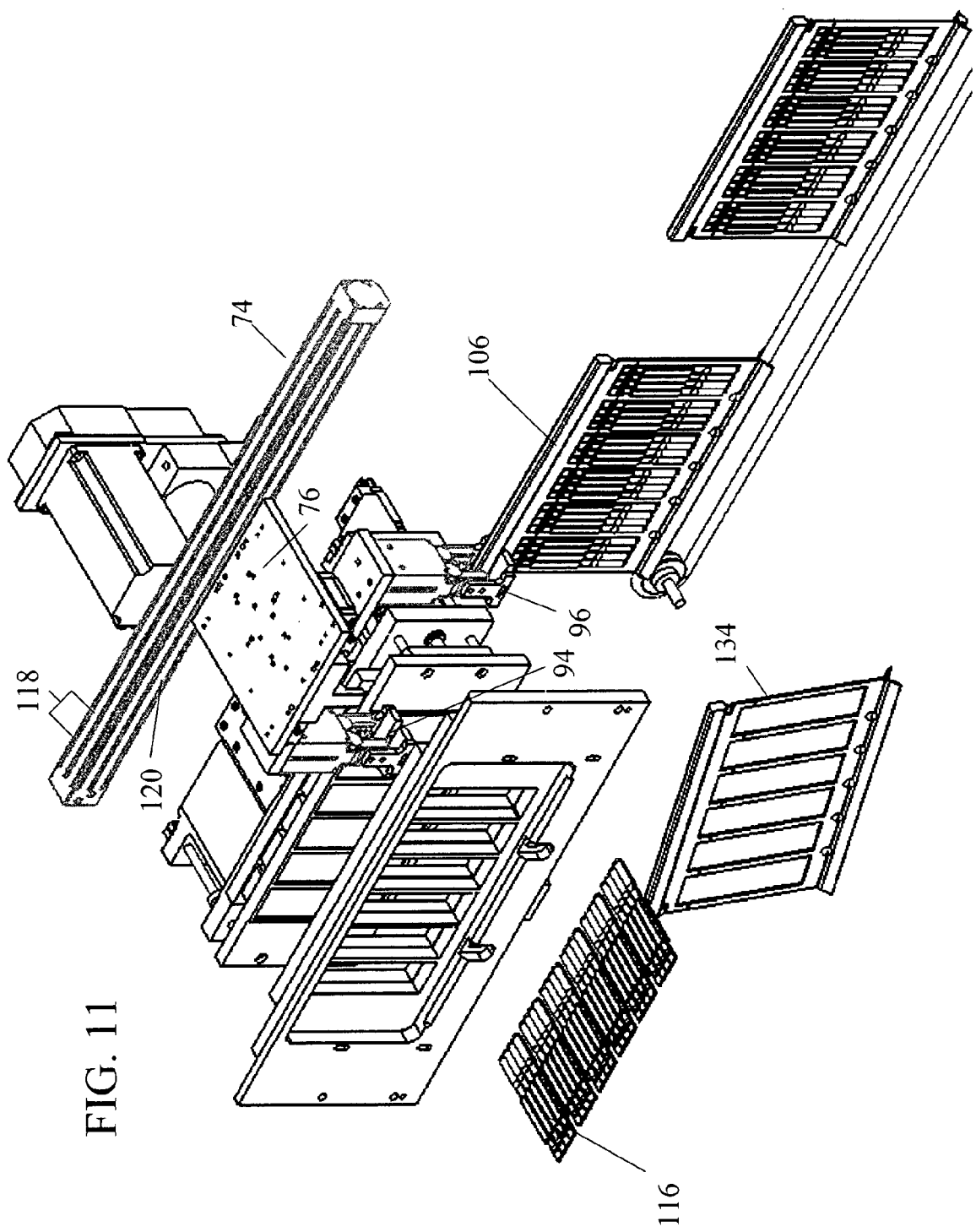
FIG. 11 is a perspective view of an eighth tooling sequence of the load cell deflasher assembly and card transfer slide actuator of FIG. 4 wherein gripper jaws of the grippers open to drop the deflashed extrude extrusion frame and the gripper carriage returns to a start position to obtain a new extrusion.

At FIG. 11 a final eighth tooling sequence is illustrated wherein the gripper jaws open to gravity drop discard the deflashed extrusion card frame 134 from the grippers and the gripper carriage moves along the longitudinal slot 120 of card transfer positioning actuator 74 to return to its extrusion card pick-up position to restart the tooling sequences with the next extrusion card 106.

The foregoing structural, functional, and sequential aspects of the mechanical assemblies of the present invention are subject to selected and defined controls. In this regard, FIG. 12 is a schematic diagram illustrating the sensing, measurement, control, and adjustment interactions of both the positioning actuator 12 of punch 14 and the card transfer positioning actuator 74 of the gripper carriage 76 with a programmable logic controller 136. Such sensing, measurement, control, and adjustment interactions advantageously respond to production run environmental factors that could adversely affect the deflashing process such as of the extrusion, or extrusion cooling shrinkage fluctuation in room temperature, variation in wall thickness or weight of the extrusion, resin composition, among other factors.

As previously discussed when an extrusion with its attendant work piece or product is presented to the card transfer positioning actuator 74, the gripper jaws 94, 96 attach to an upper portion of the extrusion and linearly directs the extrusion to its position for punch and die deflashing via the corresponding linear movement of the gripper carriage 76 within the longitudinal slot 120 of the card transfer positioning actuator. The relative position of the gripper carriage 76 along the length of the longitudinal slot 120 of the card transfer positioning actuator 74, especially along the second portion 128 of the longitudinal slot 120 distal from the extrusion pickup position and proximal to the punch and die, demarks variable positions of the extrusion relative to the punch and die. The ultimate deflash position 126 of the extrusion can be refined and optimized by the present invention by the card transfer positioning actuator 74 varying the gripper carriage 76 position along the second portion 128 of the longitudinal slot 120 in response to a command of the programmable logic controller 136.

Figure 12:
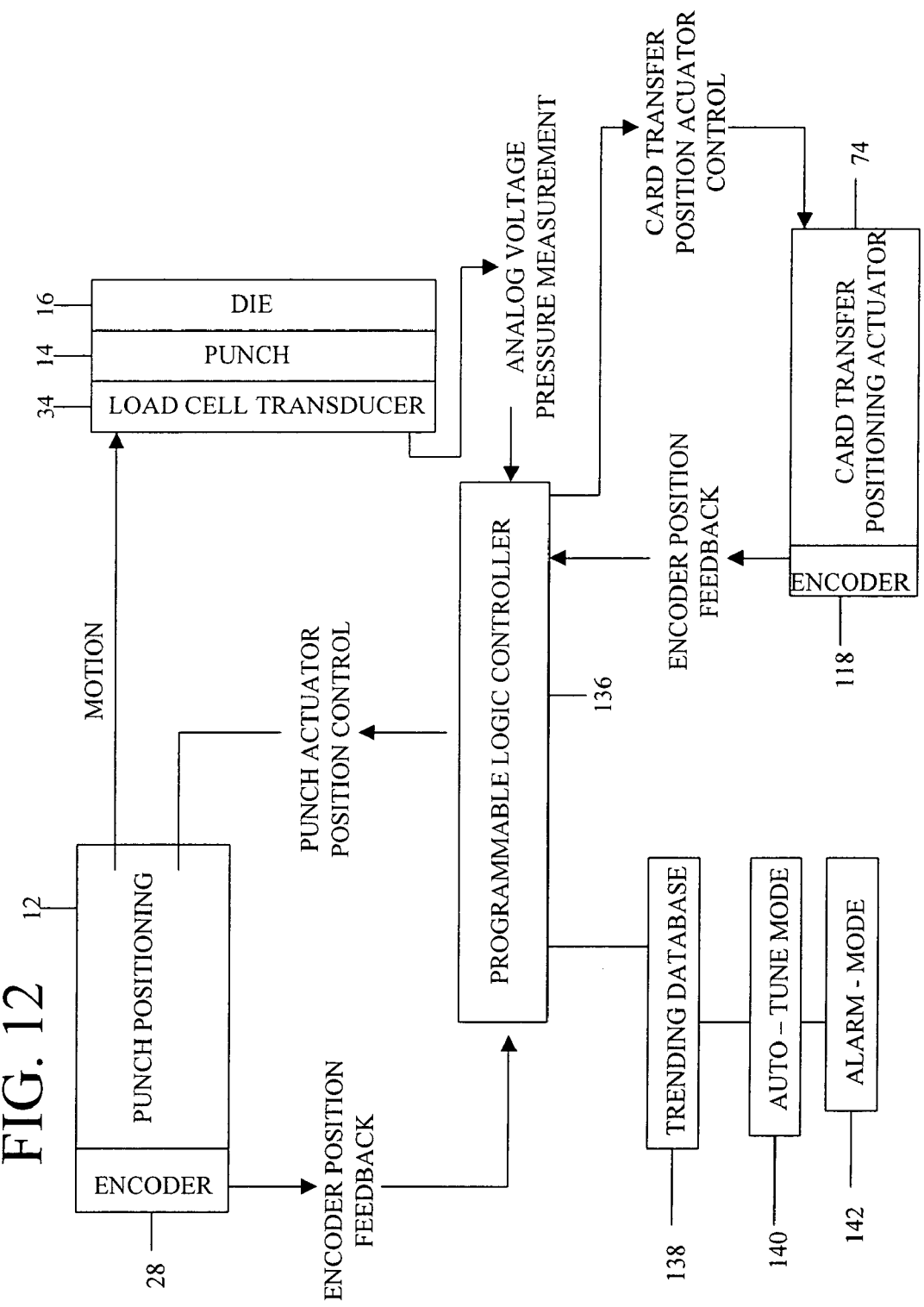
FIG. 12 is a schematic diagram of the sensing, measurement, control, and adjustment interactions of both the positioning actuator of the load cell deflasher and the card transfer slide actuator of the extrusion positioning assembly with a programmable logic controller.

As shown in FIG. 12, in the present invention this variance is adjustable, controlled, and preferably segmentally measured to optimize the final setting of the extrusion against the die consistent with load cell pressure transducer data readings of the punch positioning actuator. In particular, as the punch positioning actuator 12 extends to advance the punch 14 towards the die 16, the load cell pressure transducer 34 will monitor the resistive force applied to the punch as it advances into the die and send an analogue voltage feedback signal of pressure measurement to a programmable logic controller 136. The programmable logic controller 136 will log this signal, preferably in a converted pounds of pressure form, in a trending database 138.

Figure 15:
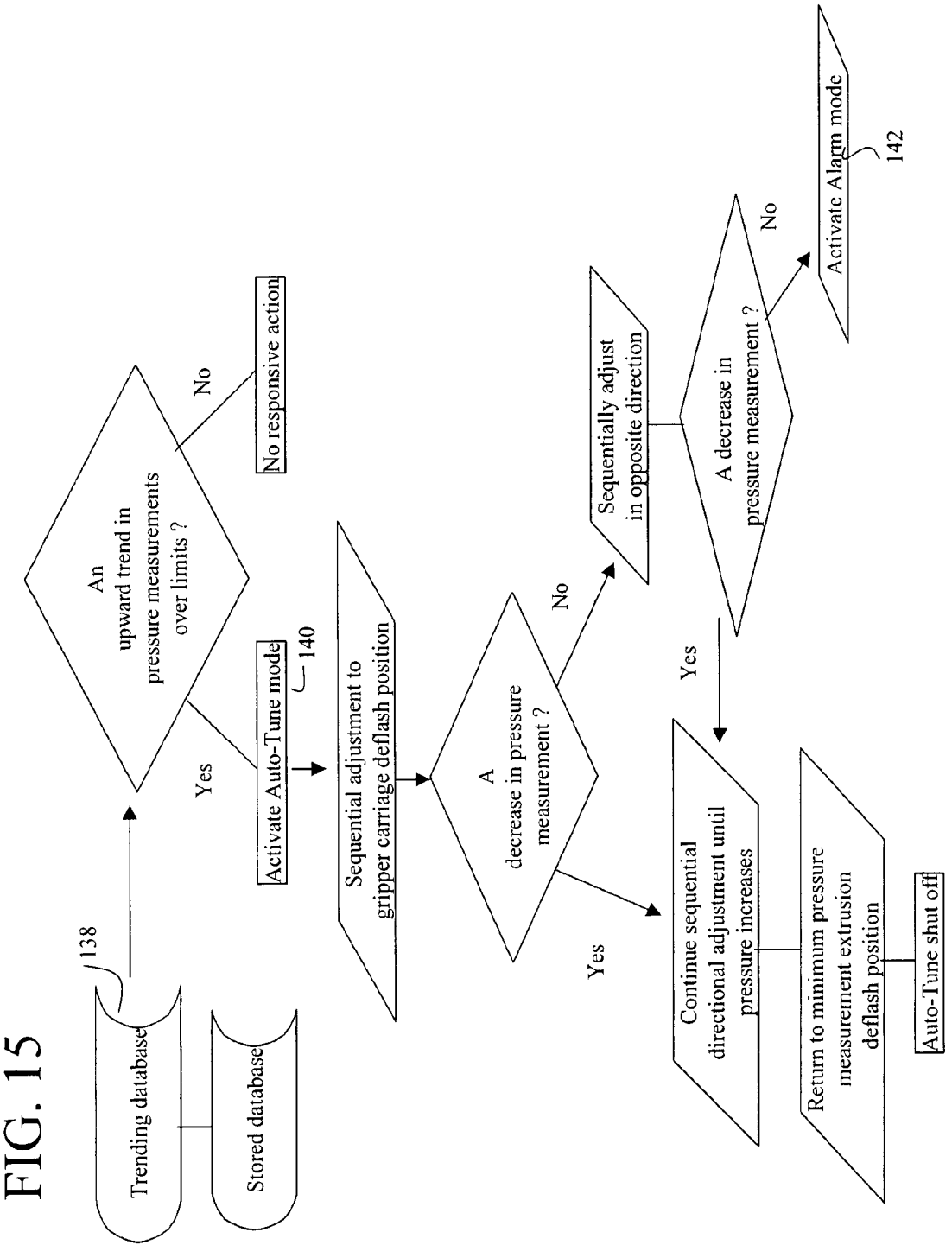
FIG. 15 is a flowchart diagram of a method for adjustably positioning an extrusion in intervening proximity between a punch and a die in a segmentally measured selected direction in response to a determined trend of pressure measurements by command of a programmable logic controller executed by a positioning actuator of a gripper carriage.

In the event the programmable logic controller 136 detects an upward trending in the trending database 138 exceeding a set "auto-tune" threshold limit (indicating increasing pressure exerted on the load cell during the punching motion), an auto-tune mode 140 of the programmable logic controller 136 will be activated. As best illustrated at the flowchart diagram of FIG. 15, upon activation of the auto-tune mode 140, in the subsequent deflashing cycles, the programmable logic controller 136 will command the card transfer positioning actuator 76 to make sequential adjustments to the gripper carriage 76 position along the second portion 128 of the longitudinal slot 120, hence adjusting the extrusion deflash position at the punch and die. For example, the relative position of the gripper carriage along the length of the engagement slot of the card transfer positioning actuator may be adjusted a 0.0001 inch distal from the extrusion pick-up position. The programmable logic controller 136 will monitor the resulting trending changes in the trending database 138 in an effort to find the position with the minimal force applied to the load cell during the punching motion.

If the trending decreases, the auto-tune mode will continue to adjust the product position in the same direction on the following cycles. This process will repeat itself until the pressure trend sensed by the load cell increases. This reverse in the pressure trend will indicate that the optimum product position at the die has been passed. The programmable logic controller will recognize the change and return the gripper carriage 76 to the position at the second portion 128 of the longitudinal slot 120 of the card transfer positioning actuator where the trending data 138 logged a minimum pressure measurement whereupon the auto tune mode 140 will then shut off allowing the load cell deflasher assembly to operate without changes until the trend data next exceeds the set "auto-tune" limit.

If the trending increases, the auto tune mode 140 will start to adjust the product position in the opposite direction on the following cycles in a manner as previously discussed. For example, the relative position of the gripper carriage along the length of the engagement slot of the card transfer positioning actuator may be adjusted a 0.0001 inch toward the extrusion pickup position. This process will repeat itself until the pressure trend sensed by the load cell increases. This reverse in the pressure trend will again indicate that the optimum product position at the die has been passed. The programmable logic controller 136 will recognize the change and return the gripper carriage 76 to the position at the second portion 128 of the longitudinal slot 120 of the card transfer positioning actuator 74 where the trending data was at a minimum. The auto-tune mode will then shut off allowing the load cell deflasher assembly to operate without changes until the trend data next exceeds the set "auto-tune" limit.

If the auto-tune mode is unable to stop the upward trending after attempting to adjust product position in both directions, then the programmable logic controller will alert the operator through a suitable alarm mode 142 providing an audible sound/horn signal or a visible light signal to caution or alert an operator.

To accomplish the foregoing sensing, monitoring, and adjustment, the load cell pressure transducer 34 provides feedback data to the programmable logic controller 136. Punch stroke pressure is monitored by the load cell pressure transducer during each deflashing sequence. With each deflashing sequence, the programmable logic controller 136 logs pressure measurements and builds upon its trending database 138 to determine any general trending deviation over time relative to a selected threshold excess limit suited for the particular deflashing procedure undertaken. For example, the load cell pressure transducer 34 may provide analog voltage feedback signals to the programmable logic controller 136. Depending upon the particular extrusion product application, an analogue voltage scale of equivalent positive to negative voltage is established, for example a scale of –2000 volts dc to 0 volts dc to +2000 volts dc, wherein the –2000 volts dc indicates full retraction of the punch 14 and +2000 volts dc indicates full extension of the punch assembly 14. The analogue dc voltage signal may be converted to metric pound units for both storage in the trending database 138 and display at an operator monitor. The load cell feedback signals are supplemented by the encoder 18 of the punch positioning actuator 12 and the encoder 118 of card transfer positioning actuator 74 each monitoring the exact positioning of the punch 14 and the gripper carriage 74 respectively, and communicating their positions to the programmable logic controller 136 which correlates the same to each analogue voltage signal. Responsive to the feedback signals received from the load cell pressure transducer 34 and from the encoders 18 and 118, the programmable logic controller 136 can command position control instructions to both the punch position actuator 12 directing or adjusting the position of punch 14 and to the card transfer positioning actuator 74 directing or adjusting the position of the gripper carriage 76. Still further, the trending database 140 can save and store its data for later access on subsequent product deflashing runs, especially if tooling changes are made in the interim or if the deflashing involves new shapes or amounts of product. Suitable software programming for the foregoing described programmable logic controller 136 functions are readily available to those skilled in the software programming arts.

Figure 13:
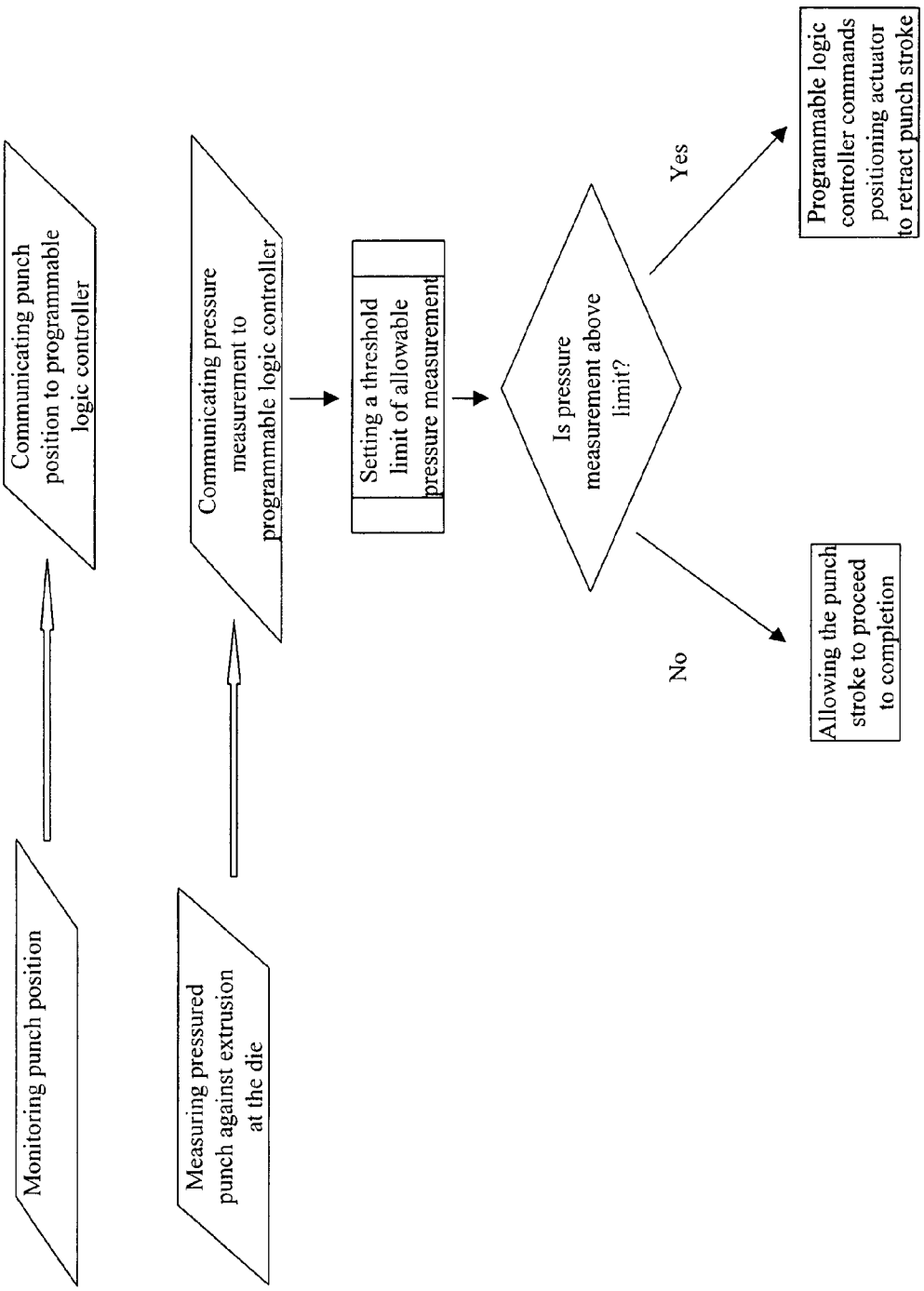
FIG. 13 is a flowchart diagram of a method for deflashing product from an extrusion adjustably positioned in intervening proximity between the punch and the die.
Figure 14:
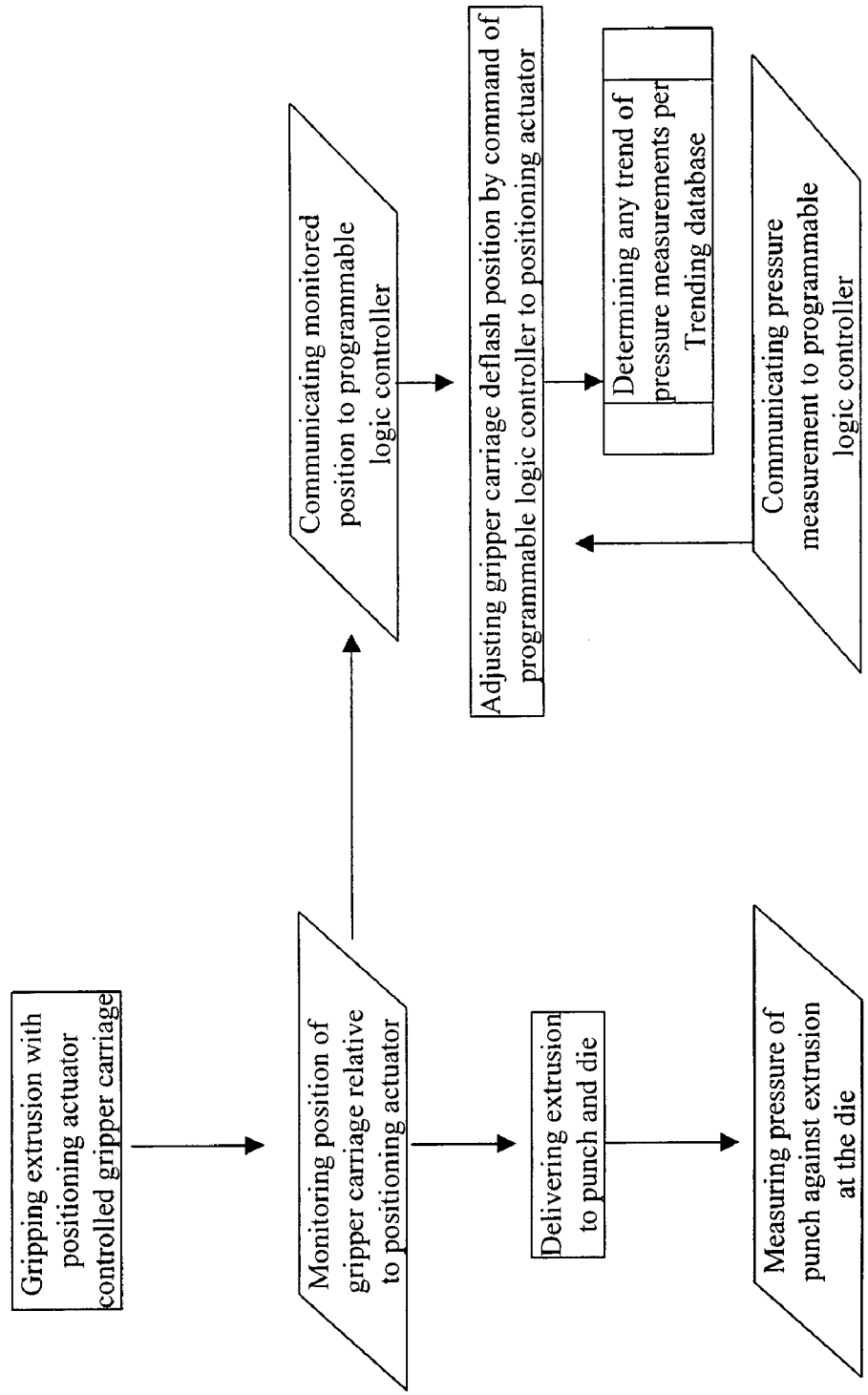
FIG. 14 is a flowchart diagram of a method for adjustably positioning an extrusion in intervening proximity between a punch and die for deflashing.

In accordance with the foregoing, FIG. 13 illustrates a flowchart diagram of a method for deflashing product from extrusion adjustably positioned in intervening proximity between the punch and the die. The encoder 118 of card positioning actuator 76 monitors the punch position and indicates the same to the programmable logic controller 136, while the encoder 28 of the punch positioning actuator 12 communicates pressure measurements of the punch against the extrusion at the die to the programmable logic controller 136. As best suited the particular deflashing operation involved, a pre-set threshold limit of allowable pressure measurement is established and if the pressure measurement is at or below the pre-set threshold limit, the punch stroke is allowed to proceed to completion yet if the pressure measurement is above the pre-set threshold limit the programmable logic controller commands the positioning actuator 12 to retract the punch stroke without deflashing product from the extrusion. In addition to controlling the punch stroke, FIG. 14 illustrates a flowchart diagram of a method for adjustably positioning extrusion in intervening proximity between the punch and die for deflashing. After the pair of gripper jaws 94 and 96 clamp engaged a selected extrusion card 98 and gripper carriage 76 commences to deliver the same for deflashing, the position of the gripper carriage 76 relative to the longitudinal slot 120 of the card transfer positioning actuator 74 is monitored and the monitored position is communicated to the programmable logic controller 136. Upon delivering the extrusion to the deflash position in intervening proximity between the punch and die, the load cell pressure transducer 34 measurement of the pressure of the punch against the extrusion at the monitored deflash position is communicated to the programmable logic controller 136 which may adjust the gripper carriage deflash position by command of the programmable logic controller to the card transfer positioning actuator 74 particularly upon determining any upward trend of pressure measurements as previously discussed relative to the trending database 138.

From the foregoing description, it will be apparent that the several aspects of the Load Cell Deflasher Assembly And Method of the present invention have a number of advantages, some of which have been described above and others of which are inherent in the invention. Also it will be understood that modifications can be made to the several embodiments of the present invention described above without departing from the teachings of the present invention. Accordingly, the scope of the invention is only to be limited as necessitated by the accompanying claims.

We claim:

1. A method for deflashing product from an extrusion adjustably positioned in intervening proximity between a punch and die comprising the steps of:
    monitoring the position of said punch,
    communicating the monitored position of said punch to a programmable logic controller,
    measuring the pressure of the punch against said extrusion at said die
    communicating said pressure measurement to said programmable logic controller,
    setting a threshold limit of allowable pressure of the punch against said extrusion at said die,
    controlling the extension and retraction of the punch stroke of said punch in response to said pressure measurement by commands of said programmable logic controller executed by a positioning actuator of the punch wherein if the measured pressure of the punch against said extrusion at said die is equal to or less than said threshold limit allowing the punch stroke to be completed and wherein if the measured pressure of the punch against said extrusion at said die is greater than said threshold limit retracting the punch stroke.

2. A method for adjustably positioning an extrusion in intervening proximity between a punch and die for deflashing comprising the steps of:
    gripping said extrusion by structure interconnected with a gripper carriage engaged to a positioning actuator,
    monitoring the position of said gripper carriage relative to said positioning actuator,
    communicating the monitored position of said gripper carriage relative to said positioning actuator to a programmable logic controller,
    delivering said extrusion to a deflash position in intervening proximity between said punch and die,
    measuring the pressure of the punch against said extrusion at said die at the deflash position,
    communicating said pressure measurement to said programmable logic controller,
    adjusting the deflash position by commands of said programmable logic controller executed by said positioning actuator of the gripper carriage.

3. The method for adjustably positioning an extrusion in intervening proximity between a punch and die for deflashing of claim 2 further comprising the steps of
    maintaining a trending database of the pressure measurements communicated to said programmable logic controller, and
    determining any trend of the pressure measurements.

4. The method for adjustably positioning an extrusion in intervening proximity between a punch and die for deflashing of claim 3 further comprising the step of
    adjusting the previous deflash position in a segmentally measured selected direction in response to the determined trend by command of said programmable logic controller executed by said positioning actuator of the gripper carriage.

5. The method for adjustably positioning an extrusion in intervening proximity between a punch and die for deflashing of claim 4 further comprising the step of
    monitoring any change in the pressure measurement resultant from the newly adjusted deflash position in a segmentally measured selected direction.

6. The method for adjustably positioning an extrusion in intervening proximity between a punch and die for deflashing of claim 5 wherein if the monitored change indicates a decrease in the pressure measurement, then performing the step of
    adjusting the prior deflash position further in said segmentally measured selected direction.

7. The method for adjustably positioning an extrusion in intervening proximity between a punch and die for deflashing of claim 6 wherein if the monitored change of the further adjustment indicates a decrease in the pressure measurement, then performing the step of
    sequentially adjusting the prior deflash position still further in said segmentally measured selected direction until trending database determines an increase in said pressure measurement.

8. The method for adjustably positioning an extrusion in intervening proximity between a punch and die for deflashing of claim 7 wherein upon determining the increase in said pressure measurement the following step is preformed:
    returning the deflash position of said extrusion to the position where the trending database determines the pressure measurement was at a minimum.

9. The method for adjustably positioning an extrusion in intervening proximity between a punch and die for deflashing of claim 5 wherein if the monitored change indicates a increase in the pressure measurement, then performing the step of
    adjusting the prior deflash position further in a segmentally measured direction opposite the initially selected direction.

10. The method for adjustably positioning an extrusion in intervening proximity between a punch and die for deflashing of claim 9 wherein if the monitored change of the further adjustment indicates a decrease in the pressure measurement, then performing the step of sequentially adjusting the prior deflash position still further in said segmentally measured opposite direction until trending database determines an increase in said pressure measurement.

11. The method for adjustably positioning an extrusion in intervening proximity between a punch and die for deflashing of claim 10 wherein upon determining the increase in said pressure measurement the following step is preformed:
returning the deflash position of said extrusion to the position where the trending database determines the pressure measurement was at a minimum.

12. A load cell deflasher assembly for the processing of product from an extrusion comprising:
a positioning actuator operatively interconnected with a punch and capable of extension and retraction of said punch, said punch having at least one exteriorly facing punch surface cooperatively aligned to interact with said extrusion against a die, said positioning actuator having an encoder in communication with a programmable logic controller, said encoder being capable of monitoring the position of said punch and communicating the same to said programmable logic controller,
a load cell pressure transducer interconnected with said positioning actuator for measuring the pressure of said punch against said extrusion at said die, said load cell pressure transducer capable of communicating said pressure measurements to said programmable logic controller,
said positioning actuator being capable of extension or retraction of said punch in response to a command of said programmable logic controller based on said pressure measurement.

13. The load cell deflasher assembly of claim 12 wherein if said pressure measurements of said load cell pressure transducer communicated to said programmable logic controller is equal to or less than a selected threshold limit an extension punch stroke is completed.

14. The load cell deflasher assembly of claim 12 wherein if said pressure measurements of said load cell pressure transducer communicated to said programmable logic controller is greater than a selected threshold limit an extension punch stroke is aborted in favor of a retraction punch stroke.

15. The load cell deflasher assembly of claim 12 wherein said punch includes a plurality of punch surfaces cooperatively aligned to a corresponding plurality of shear pockets of a die.

16. The load cell deflasher assembly of claim 15 wherein said plurality of punch surfaces are supported by at least one backing plate.

17. The load cell deflasher assembly of claim 15 wherein said plurality of shear pockets of a die are supported by at least one backing plate.

18. The load cell deflasher assembly of claim 12 wherein said punch is interconnected upon at least one support rail for axial extension and retraction.

19. A positioning assembly for variable positioning of an extrusion relative to a punch and die of a deflashing assembly comprising:
a positioning actuator cooperatively aligned with said punch and a die, said positioning actuator having an encoder in communication with a programmable logic controller,
a gripper carriage engaged to said positioning actuator having means for gripping said extrusion and delivering said extrusion to a deflash position in intervening proximity between said punch and die,
said encoder being capable of monitoring the position of said gripper carriage relative to said positioning actuator and communicating the same to the programmable logic controller,
said positioning actuator being capable of adjustably positioning said gripper carriage relative to said positioning actuator in response to a command of said programmable logic controller to thereby alter the deflash position of said extrusion in intervening proximity between said punch and die.

20. The positioning assembly of claim 19 wherein said means for gripping said extrusion and delivering said extrusion to a deflash position in intervening proximity between said punch and die comprise a shuttle plate interconnected with said gipper carriage having at least one gripper, said gripper terminating in a gripper jaw capable of engaging said extrusion card and delivering the same in adjustable proximity between said punch and die by movement of said gripper carriage relative to said positioning actuator.

21. The positioning assembly of claim 20 wherein said gripper jaw engages the extrusion at a defined reference point thereof, said reference point being indicative of the relative location of the product to be deflashed from the extrusion.

22. The positioning assembly of claim 21 wherein said reference point is an irregular surface area at an upper portion of said extrusion.

23. The positioning assembly of claim 20 wherein said shuttle plate has a pair aligned grippers, said grippers terminating in a pair of aligned gripper jaws capable of engaging said extrusion and delivering the same in proximity to said punch and die by movement of said gripper carriage relative to said positioning actuator.

24. The positioning assembly of claim 23 wherein said gripper jaws engage the extrusion, respectively, at a proximal defined reference point thereof and at a distal defined reference point thereof, said reference points, in combination, being indicative of the relative location of the product to be deflashed from the extrusion.

25. The positioning assembly of claim 24 wherein said proximal and distal reference points are each an irregular surface area at an upper portion of said extrusion, said surface areas comprising borders indicating, in combination, the relative location of the product to be deflashed from the extrusion there between.

26. The positioning assembly of claim 19 wherein said engagement of said gripper carriage with said positioning actuator comprises the positioning actuator having a longitudinal slot and a side portion of said gripper carriage being suited to engage said longitudinal slot for linear movement therein in response to commands of said programmable logic controller executed by said positioning actuator.

27. The positioning assembly of claim 19 wherein said adjustable position of said gripper carriage relative to said positioning actuator in response to a command of said programmable logic controller presents an entire extrusion to the punch and die for deflashing.

28. The positioning assembly of claim 19 wherein said adjustable position of said gripper carriage relative to said positioning actuator in response to a command of said programmable logic controller presents only a portion of said extrusion to the punch and die for deflashing.

29. The positioning assembly of claim 28 wherein said product of said extrusion is sequentially presented to the punch and die for deflashing.

30. The positioning assembly of claim 20 further including a setting body attached to said shuttle plate which is movable to position at least a portion of said extrusion against said die.

31. The positioning assembly of claim 30 wherein said setting body is movable in a direction perpendicular to the path of said shuttle plate.

32. The positioning assembly of claim 20 wherein upon the extrusion being deflashed, the gripper jaw of the gripper opens to drop the deflashed extrusion and the gripper carriage returns to a paison pick up position to obtain a new extrusion.

33. The positioning assembly of claim 26 wherein the locus of said engagement of said gripper carriage within said longitudinal slot of said positioning actuator defines a extrusion pick up position of said gripper carriage at a portion of said longitudinal slot proximal to a supply of extrusions and a extrusion deflashing position and a portion of said longitudinal slot distal from the supply of extrusions.

34. The positioning assembly of claim 33 wherein the extrusion deflashing position is variable along said portion of said longitudinal slot distal from the supply of extrusions.

35. A load cell deflasher assembly for the processing of product from an extrusion in combination with a positioning assembly for variable positioning of said extrusion relative to a punch and die of said deflashing assembly comprising:
a first positioning actuator operatively interconnected with a punch and capable of extension and retraction of said punch, said punch having at least one exteriorly facing punch surface cooperatively aligned to interact with said extrusion against a die, said first positioning actuator having a first encoder in communication with a programmable logic controller, said first encoder being capable of monitoring the position of said punch and communicating the same to said programmable logic controller,
a load cell pressure transducer interconnected with said first positioning actuator for measuring the pressure of said punch against said extrusion at said die, said load cell pressure transducer capable of communicating said pressure measurements to said programmable logic controller,
said first positioning actuator being capable of extension or retraction of said punch in response to a command of said programmable logic controller based on said pressure measurement,
a second positioning actuator cooperatively aligned with said punch and a die, said second positioning actuator having a second encoder in communication with said programmable logic controller,
a gripper carriage engaged to said second positioning actuator having means for gripping said extrusion and delivering said extrusion to a deflash position in intervening proximity between said punch and die,
said second encoder being capable of monitoring the position of said gripper carriage relative to said second positioning actuator and communicating the same to the programmable logic controller,
said second positioning actuator being capable of adjustably positioning said gripper carriage relative to said second positioning actuator in response to a command of said programmable logic controller based on said pressure measurements of the load cell pressure transducer to thereby set or vary the deflash position of said extrusion in intervening proximity between said punch and die.

36. The load cell deflasher assembly in combination with the positioning assembly of claim 35 wherein said programmable logic controller further includes a trending database of logged pressure measurements of said load cell pressure transducer.

37. The load cell deflasher assembly in combination with the positioning assembly of claim 36 wherein said programmable logic controller further includes an auto-tune mode such that if said programmable logic controller detects an upward trending of said pressure measurements in said trending database exceeding a selected threshold limit, said auto-tune mode of the programmable logic controller is activated.

38. The load cell deflasher assembly in combination with the positioning assembly of claim 37 wherein upon activation of said auto-tune mode of said programmable logic controller, in a subsequent deflashing cycle of extrusion, the programmable logic controller commands said second positioning actuator to make a adjustment to the deflash position of said gripper carriage relative to said second positioning actuator.

39. The load cell deflasher assembly in combination with the positioning assembly of claim 38 wherein the adjustment to the deflash position of said gripper carriage relative to said second positioning actuator is in the range of 0.0001 of an inch to 0.01 of an inch.

40. The load cell deflasher assembly in combination with the positioning assembly of claim 38 wherein the adjustment to the deflash position of said gripper carriage relative to said second positioning actuator is in a segmentally measured direction distal from a extrusion pickup position.

41. The load cell deflasher assembly in combination with the positioning assembly of claim 38 wherein the adjustment to the deflash position of said gripper carriage relative to said second positioning actuator is in a segmentally measured direction proximal to a extrusion pickup position.

42. The load cell deflasher assembly in combination with the positioning assembly of claim 38 wherein upon having made an adjustment to the deflash position of said gripper carriage relative to said second positioning actuator, the programmable logic controller determines a change in said trending database.

43. The load cell deflasher assembly in combination with the positioning assembly of claim 42 wherein if said change in said trending database represents a decrease in said pressure measurement of said load cell pressure transducer, the programmable logic controller commands a further adjustment to the deflash position of said gripper carriage relative to said second positioning actuator in the same segmentally measured direction as the initial adjustment thereof.

44. The load cell deflasher assembly in combination with the positioning assembly of claim 43 wherein if said further adjustment to the deflash position of said gripper carriage relative to said second positioning actuator in the same segmentally measured direction as the initial adjustment thereof results in a change in said trending database representing a decrease in said pressure measurement of said load cell pressure transducer, the programmable logic controller commands still further sequential adjustments to the deflash position of said gripper carriage relative to said second positioning actuator continuing in the same segmentally measured direction as the immediately prior adjustment thereof until the trending database determines an increase in said pressure measurement of said load cell pressure transducer.

45. The load cell deflasher assembly in combination with the positioning assembly of claim 44 wherein upon determining said increase in said pressure measurement of said load cell pressure transducer, the programmable logic controller commands an adjustment to the deflash position of said gripper carriage relative to said second positioning actuator to the position where the trending database determines the pressure measurement of said load cell pressure transducer was at a minimum.

46. The load cell deflasher assembly in combination with the positioning assembly of claim 45 wherein upon adjusting the deflash position of said gripper carriage relative to said second positioning actuator to the position where the trending database determines the pressure measurement of said load cell pressure transducer was at a minimum, said auto-tune mode of said programmable logic controller shuts off until it is again activated by said programmable logic controller detecting an upward trending of said pressure measurements in said trending database exceeding a selected threshold limit.

47. The load cell deflasher assembly in combination with the positioning assembly of claim 42 wherein if said change in said trending database represents an increase in said pressure measurement of said load cell pressure transducer, the programmable logic controller commands a further adjustment to the deflash position of said gripper carriage relative to said second positioning actuator in a segmentally measured direction opposite the initial adjustment thereof.

48. The load cell deflasher assembly in combination with the positioning assembly of claim 47 wherein if said further adjustment to the deflash position of said gripper carriage relative to said second positioning actuator in the segmentally measured direction opposite the initial adjustment thereof results in a change in said trending database representing a decrease in said pressure measurement of said load cell pressure transducer, the programmable logic controller commands still further sequential adjustments to the deflash position of said gripper carriage relative to said second positioning actuator continuing in the same segmentally measured direction as the immediately prior adjustment thereof until the trending database determines an increase in said pressure measurement of said load cell pressure transducer.

49. The load cell deflasher assembly in combination with the positioning assembly of claim 48 wherein upon determining said increase in said pressure measurement of said load cell pressure transducer, the programmable logic controller commands an adjustment to the deflash position of said gripper carriage relative to said second positioning actuator to the position where the trending database determines the pressure measurement of said load cell pressure transducer was at a minimum.

50. The load cell deflasher assembly in combination with the positioning assembly of claim 49 wherein upon adjusting the deflash position of said gripper carriage relative to said second positioning actuator to the position where the trending database determines the pressure measurement of said load cell pressure transducer was at a minimum, said auto-tune mode of said programmable logic controller shuts off until it is again activated by said programmable logic controller detecting an upward trending of said pressure measurements in said trending database exceeding a selected threshold limit.

51. The load cell deflasher assembly in combination with the positioning assembly of claim 37 further includes an alarm which is activated if said auto-tune mode of said the programmable logic controller is unable to stop an upward trending of said pressure measurement readings of said load cell pressure transducer after having made a sequential adjustments to the deflash position of said gripper carriage relative to said second positioning actuator in directions both proximal and distal of the extrusion pick up position.

52. The load cell deflasher assembly in combination with the positioning assembly of claim 51 wherein said alarm is an audible or visual signal.

* * * * *